(12) United States Patent
Edelman et al.

(10) Patent No.: US 11,758,834 B2
(45) Date of Patent: Sep. 19, 2023

(54) METHOD FOR MIXING A STREAM OF PARTICULATE MATERIAL BY INDUCING BACKFLOW WITHIN AN INCLINED BELT CONVEYOR

(71) Applicant: KSi Conveyor, Inc., Sabetha, KS (US)

(72) Inventors: Matthew J. Edelman, Sabetha, KS (US); Jason P. Kaeb, Sabetha, KS (US); Paul A. Kaeb, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 585 days.

(21) Appl. No.: 16/947,035

(22) Filed: Jul. 15, 2020

(65) Prior Publication Data

US 2021/0029867 A1 Feb. 4, 2021

Related U.S. Application Data

(60) Provisional application No. 62/879,940, filed on Jul. 29, 2019.

(51) Int. Cl.
*A01C 1/06* (2006.01)
*A01C 1/00* (2006.01)
(Continued)

(52) U.S. Cl.
CPC ............... *A01C 1/06* (2013.01); *A01C 1/00* (2013.01); *B01F 23/54* (2022.01); *B01F 23/60* (2022.01);
(Continued)

(58) Field of Classification Search
CPC ... A01C 1/06; A01C 1/08; B01F 23/54; B01F 23/60; B01F 25/43161; B01F 25/431971;
(Continued)

(56) References Cited

U.S. PATENT DOCUMENTS 2,580,854 A * 1/1952 Sherman ................. B01F 33/26
366/219
2,880,522 A 4/1959 Rollins
(Continued)

FOREIGN PATENT DOCUMENTS

CN 204223801 U * 3/2015
CN 207491478 U 6/2018
(Continued)

OTHER PUBLICATIONS

English translation of FR2788795, Debrandere, obtained on May 19, 2023 from < https://worldwide.espacenet.com/> (Year: 2023).*
(Continued)

*Primary Examiner* — Walter D. Griffin
*Assistant Examiner* — Patrick M McCarty
(74) *Attorney, Agent, or Firm* — Coughlin Law Office LLC; Daniel J. Coughlin; Stuart M. Aller

(57) ABSTRACT

An inclined belt conveyor capable of mixing particulate material, such as agricultural seed or fertilizer. Inserting a plurality of mixing baffles into the stream of the particulate material induces a backflow of the particulate material. In the case of wet, freshly treated plant seed, this backflow causes a mixing, polishing, and drying of the plant seed. The mixing distributes the seed treatment into an even coat by rubbing the individual seeds of the seed flow stream together. The inclined belt conveyor may also be used to blend multiple varieties or types of particulate material. The mixing baffles are oriented to induce backflow and sideways lateral movement and may incorporate a passage to allow increase particulate material flow rate. The mixing baffles can selectively deploy between an angle of 20 degrees to 70 degrees to enable the mixing inclined belt conveyor to have a transfer-speed-maximizing mode and a mixing mode.

20 Claims, 5 Drawing Sheets

(51) Int. Cl.
| | |
|---|---|
| *B29B 7/60* | (2006.01) |
| *F26B 15/12* | (2006.01) |
| *F26B 25/14* | (2006.01) |
| *B01F 23/50* | (2022.01) |
| *B01F 35/00* | (2022.01) |
| *B01F 25/431* | (2022.01) |
| *B01F 23/60* | (2022.01) |
| *F26B 3/06* | (2006.01) |
| *F26B 15/22* | (2006.01) |
| *F26B 21/00* | (2006.01) |
| *B29B 7/30* | (2006.01) |
| *B29B 7/58* | (2006.01) |
| *A01C 1/08* | (2006.01) |
| *B01F 101/09* | (2022.01) |

(52) U.S. Cl.
CPC .... *B01F 25/4316* (2022.01); *B01F 25/43161* (2022.01); *B01F 25/431971* (2022.01); *B01F 35/55* (2022.01); *B29B 7/30* (2013.01); *B29B 7/584* (2013.01); *B29B 7/60* (2013.01); *F26B 3/06* (2013.01); *F26B 15/12* (2013.01); *F26B 15/22* (2013.01); *F26B 21/004* (2013.01); *F26B 25/14* (2013.01); *A01C 1/08* (2013.01); *B01F 2101/09* (2022.01); *B01F 2215/0422* (2013.01); *F26B 2200/06* (2013.01); *F26B 2200/08* (2013.01)

(58) Field of Classification Search
CPC ........ B01F 35/55; B01F 35/531; B01F 33/26; B01F 33/27; B29B 7/30; B29B 7/60; B29B 7/584; F26B 3/06; F26B 15/12; F26B 15/22; F26B 21/004; F26B 25/14; F26B 2200/06; F26B 2200/08
See application file for complete search history.

(56) References Cited

U.S. PATENT DOCUMENTS

| | | | | |
|---|---|---|---|---|
| 3,096,212 | A * | 7/1963 | Rosenleaf | B28C 5/365 366/293 |
| 3,693,942 | A * | 9/1972 | Foucault | B01F 33/26 366/218 |
| 3,968,771 | A | 7/1976 | Walgenbach et al. | |
| 4,125,332 | A * | 11/1978 | Schmednecht | B28C 5/365 366/53 |
| 4,582,047 | A | 4/1986 | Williams | |
| 4,591,275 | A * | 5/1986 | Garthus | B28C 5/36 366/349 |
| 4,714,151 | A * | 12/1987 | Campbell | B65G 21/08 198/860.1 |
| 4,910,880 | A | 3/1990 | Cole | |
| 5,005,514 | A | 4/1991 | Verrico | |
| 5,052,545 | A | 10/1991 | Gongen | |
| 5,407,692 | A | 4/1995 | Caridis et al. | |
| 5,435,945 | A | 7/1995 | Paoli et al. | |
| 5,499,873 | A | 3/1996 | Cummins et al. | |
| 5,615,606 | A | 4/1997 | Vos | |
| 5,622,561 | A | 4/1997 | Cummins et al. | |
| 6,209,259 | B1 | 4/2001 | Madigan et al. | |
| 6,422,381 | B1 | 7/2002 | Eberlc et al. | |
| 8,292,065 | B1 | 10/2012 | Neufeld et al. | |
| 8,646,383 | B1 | 2/2014 | Howard | |
| 9,096,376 | B1 | 8/2015 | Wood et al. | |
| 9,671,164 | B2 * | 6/2017 | Forsyth | F26B 3/084 |
| 9,790,031 | B2 | 10/2017 | Stenson et al. | |
| 9,957,109 | B2 | 5/2018 | Kaeb et al. | |
| 10,986,770 | B2 * | 4/2021 | Forsyth | B05C 3/10 |
| 11,242,209 | B2 | 2/2022 | Graff et al. | |
| 2004/0177769 | A1 | 9/2004 | Kobayashi | |
| 2013/0168209 | A1 | 7/2013 | Fanshier et al. | |
| 2015/0359164 | A1 | 12/2015 | Bardi | |
| 2018/0124994 | A1 | 5/2018 | Kaeb et al. | |
| 2019/0009989 | A1 | 1/2019 | Francisco | |
| 2019/0075712 | A1 | 3/2019 | Reineccius et al. | |
| 2021/0031156 | A1 | 2/2021 | Edelman | |
| 2021/0094060 | A1 | 4/2021 | Heinen | |
| 2021/0094066 | A1 | 4/2021 | Heinen | |

FOREIGN PATENT DOCUMENTS

| | | | | |
|---|---|---|---|---|
| FR | 2618040 | A1 | 1/1989 | |
| FR | 2703268 | A1 | 10/1994 | |
| FR | 2788795 | A1 * | 7/2000 | ......... B01F 13/0013 |
| GB | 221642 | A * | 9/1924 | |
| GB | 2152396 | A * | 8/1985 | ............... B28C 5/36 |
| KR | 1020140121508 | A | 10/2014 | |
| SU | 1166785 | A1 * | 7/1985 | |
| SU | 1496755 | A1 * | 7/1989 | |
| WO | 2022036342 | A1 | 2/2022 | |

OTHER PUBLICATIONS

Angle of Repose, The Engineering Toolbox, obtained on May 22, 2023 from <https://www.engineeringtoolbox.com/dumping-angles-d_1531.html> (Year: 2023).*
AGI, STORM PRO Seed Treater, STORM PRO 2018, Nov. 28, 2017, 4 pages, vol. 1, www.aggrowth.com, Saskatchewan, Canada.
ECNNET Co., Ltd, et al., The blending method and the apparatus for auto-controlling ratio of size of recycling aggregate, 32 pages, This is a machine translation of a foreign patent originally published on Nov. 2, 2007 as KR100773067B1, Korea.
Benoit, Dion, Appliance for coating seeds in bulk form, by means of a liquid treatment product, This is a machine-translated text of a patent application originally published on Jan. 20, 1989 in France, No. FR2618040A1.
Jiyuan Chaoqun Agricultural Technology Development Co., Ltd, A kind of agricultural seed mixes medicine device, 5 pages, This is a machine translated text of a patent application originally published on Jun. 15, 2018, China, No. CN207491478U.
Louis, Pollione, Apparatus for moistening powdery materials, especially those of the type having hydraulic (water-based) binders, This is a machine translated text of a patent originally published on Oct. 7, 1994 in France, No. FR2703268A1.
손창구, Grain Drier, 8 pages, This is a machine translation of a patent application originally published on Oct. 16, 2014, South Korea, No. KR20140121508A.

* cited by examiner

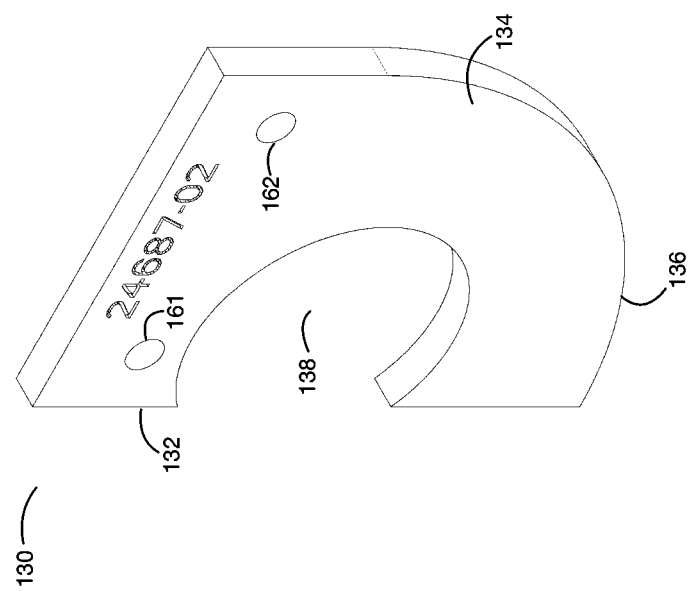

METHOD FOR MIXING A STREAM OF PARTICULATE MATERIAL BY INDUCING BACKFLOW WITHIN AN INCLINED BELT CONVEYOR

CROSS-REFERENCES

This application claims the benefit of U.S. Provisional Application No. 62/879,940, filed Jul. 29, 2019.

GOVERNMENT RIGHTS

Not Applicable.

REFERENCE TO CDS

Not Applicable.

FIELD

The present invention relates to mixing baffles to induce a determined amount of backflow within belt tube conveyors for mixing particulate material that is being conveyed.

BACKGROUND

Agricultural seeds are often treated with agrochemicals such as insecticides, fungicides, inoculants, and other compositions before planting. The time window for planting—when the weather is warm enough and the fields are dry—is often very short. This means the seed dealer must quickly treat and deliver a high volume of seed to farmers who are ready to plant their fields. These seed treatments are commonly applied by spraying a liquid composition to the surface of seed, which requires a smaller quantity of seed treatment composition than the traditional field application of treatment fluids.

The last stage of treating seeds involves mixing and drying the wet, freshly treated seed. Seed treatment systems generally incorporate a mixing drum, such as the mixing drum disclosed in U.S. Pat. Nos. 8,985,931 and 10,194,577, both patents by Terry N. Kaeb et al and assigned to KSi Conveyor, Inc. Drying drums can be expensive and take up substantial space. Alternative post-treatment plant seed mixing methods include screw conveyors, such as conventional steel augers, brush augers, and poly cupped flighting augers. Users may prefer belt conveyors over screw conveyors for transferring plant seeds. Belt conveyors are an effective solution for transporting particulate material at an incline. An endless belt is looped around rollers at the head and tail end of the conveyor. The endless belt may be spliced or made without splicing. The endless belt may incorporate texture on the carrying surface to assist with traction for carrying the load up an incline. For example, the carrying surface can incorporate crescents to assist with carrying the load. However, belt conveyors do not provide sufficient mixing during transportation.

SUMMARY

We recognized that a plurality of mixing baffles may be incorporated into a belt conveyor in order to mix seed—or other particulate material—being transported on the belt. When a belt travels through a curvilinear structure, the belt takes on a similar curvilinear cross section. The particulate material is carried on a belt through the curvilinear structure. The particulate material forms a stream. Inserting a plurality of mixing baffles into the stream of the particulate material induces a backflow of the particulate material. In the case of wet, freshly treated plant seed, this backflow causes a mixing, polishing, and drying of the plant seed. The mixing distributes the seed treatment into an even coat by rubbing the individual seeds of the seed flow stream together. The belt movement generates the seed stream flow, which is then divided and mixed using the static mixing baffles.

We recognized that alternating the lateral position of a plurality of mixing baffles that are longitudinally spaced apart in a longitudinal portion of a conveyor can effectively mix a particulate material. In the case of wet, freshly treated seed, a mixing load out conveyor is positioned downstream of a seed treatment chamber, such as the treatment chamber as disclosed in application Ser. No. 14/301,735 by Paul A. Kaeb filed Jun. 11, 2014. Prior to entering the mixing load out conveyor, the seed may pass through a seed conditioner, such as the seed flow chamber for seed conditioner disclosed in U.S. patent application Ser. No. 15493924 by Paul A. Kaeb filed Apr. 21, 2017. The seed enters the conveyor partially covered with the seed treatment fluid. The belt creates a stream of seed, which generally moves undisturbed as carried by the belt through the curvilinear structure. The angle of repose of most agriculturally important seed is such that these seeds are stable when conveyors are operated between 28° and 32° relative to the ground. Backflow of seed during conveyance is generally undesirable during conveyance in an incline conveyor. However, we recognized that backflow of seed could be induced during belt conveyor transportation in order to mix seed.

We also recognized that mounting a first baffle on a first lateral side of the conveyor slanted relative to the longitudinal axis of the conveyor could direct lateral movement of the particulate material from the first lateral side to a second lateral side of the conveyor. The particulate material ricochets off of the upstream surface of the first baffle, bouncing backwards in the longitudinal axis of the conveyor and opposite lateral side. In the situation where the particulate material is a quantity of a plant seed partially covered with a wet seed treatment, inducing backflow and directing lateral movement spreads the wet seed treatment about the quantity of the plant seed.

Some of the advantage of the seed conditioner is that it:
a. mixes particulate material during transportation up an incline belt conveyor;
b. mixing baffles induce both backflow and lateral movement;
c. belt conveyors provide complete cleanout of particulate matter, which is important when conveyors are moving material such as treated seed where customers are sensitive to cross-contamination;
d. mixing belt conveyors may be less expensive than mixing and drying drums;
e. mixing belt conveyors may take up less space than mixing and drying drums in a seed treatment system, which may be beneficial in a portable seed treatment system.

BRIEF DESCRIPTION OF DRAWINGS

Aspects are illustrated by way of example, and not by way of limitation, in the accompanying drawings, wherein:

FIG. 5 is a top-side perspective view of a mixing baffle.

DETAILED DESCRIPTION

Figure 1:
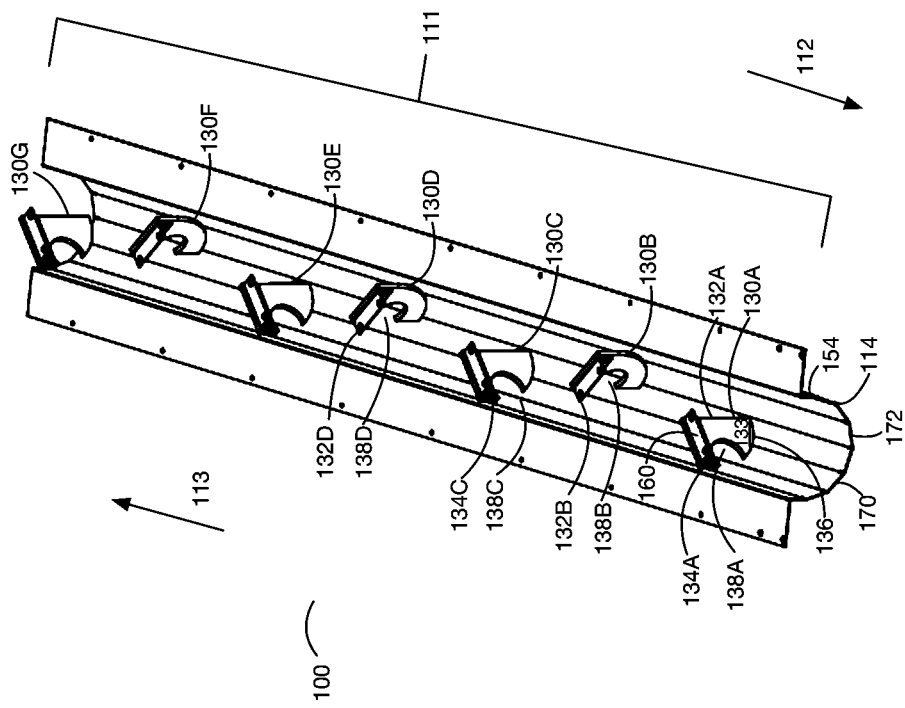
FIG. 1 is a top perspective view of the curvilinear structure of the conveyor with the lid removed showing the alternating baffles in place.

Referring now to the invention in more detail, in FIG. 1 there is shown an internal view of a conveyor 110 with mixing apparatus 100. The curvilinear structure 114 comprises the lower trough of the conveyor, through which the belt (not shown) travels. The belt conforms to the curvilinear structure 114. The belt has a carrying surface, which engages the particulate matter. The belt is endless, in that it is wrapped around a head roller and a tail roller, to make a continuous path. The belt may be spliced. The belt may have texture to assist transfer of the particulate material. The moving belt of the conveyor transports particulate material in a downstream direction (arrow 113).

The mixing apparatus 100 comprises a plurality of mixing baffles 130A, 130B, 130C, 130D, 130E, 130F, 130G, and will be referred to in general as mixing baffles 130. Mixing baffles are disposed within the curvilinear structure at a set distance from the carrying surface of the belt. The mixing baffles partially obstruct the flow of seed, inducing a prescribed amount of backflow. Generally, in an incline conveyor backflow is undesirable. However, in order to effectuate mixing, backflow disrupts the static flow of the seed within the curvilinear structure 114. The first mixing baffle 130A is mounted on the first lateral side 170 of the conveyor 110. The first mixing baffle 130A is slanted relative to the longitudinal axis of the conveyor. The slant of the mixing baffle directs lateral movement of the particulate material from the first lateral side 170 to a second lateral side 172 of the conveyor 110.

Figure 2:
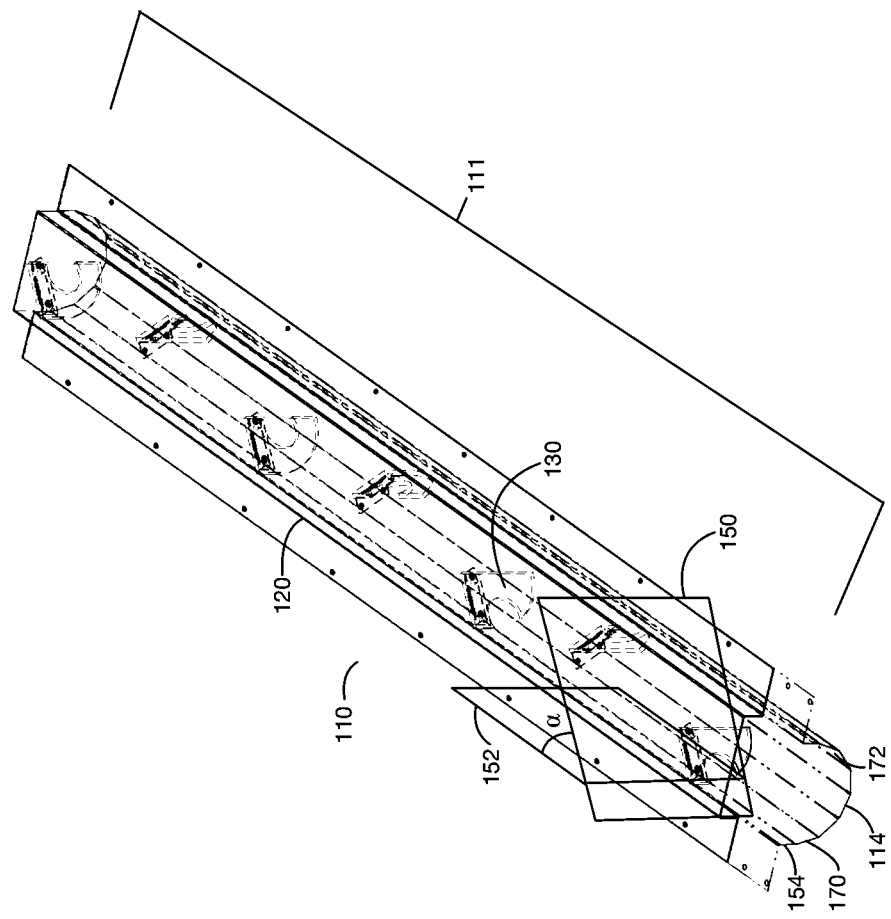
FIG. 2 is a top-side perspective view of the curvilinear structure of the conveyor with the lid shown semi-transparent.

As shown in FIG. 2, the mixing baffles 130 may be mounted to an underside of the lid 120. The lid mounts to the curvilinear structure 114 and prevents rain and debris from entering the conveyor 110 as well as preventing particulate material from exiting the conveyor 110. The mixing baffles 130 may be spaced apart longitudinally through a longitudinal portion 111 of the conveyor 110. In another embodiment, the mixing baffles 130 may be mounted to the conveyor frame (not shown). As shown in FIG. 2, the mixing baffles 130 are mounted perpendicular to the lid 120 with an L-shaped mounting bracket 160. The lid 120 may comprise a plurality of apertures corresponding to the mounting position of each of the mixing baffles 130. The mixing baffles 130 may be made out of a rigid durable material such as ultra-high-molecular-weight polyethylene, acrylonitrile butadiene styrene, or steel.

As shown in FIGS. 1 and 2, the mixing baffles 130 are mounted such that the downstream portion of the mixing baffle extends inwardly toward the center of the conveyor. The first baffle is mounted to the conveyor with a peripheral portion disposed upstream of a central portion. The particulate material ricochets off of the upstream surface 133 of the first mixing baffle 130A, causing the particulate material to move backwards (upstream, see arrow 112) in the longitudinal axis of the conveyor and toward the second lateral side 172. The first mixing baffle 130A is mounted to the conveyor 110 with a peripheral portion 134A disposed upstream of a central portion. The first mixing baffle can be mounted at less than a 50° angle (see angle α in FIG. 2) between a first plane 150 defined by the first mixing baffle 130A and a vertical plane 152 tangential to the curvilinear structure 114 of the conveyor 110 at the sidewall 154. In the situation where the particulate material is a quantity of a plant seed partially covered with a wet seed treatment, inducing backflow and directing lateral movement spreads the wet seed treatment about the quantity of the plant seed.

As shown in FIGS. 1-2, the mixing baffles 130 are disposed in alternating lateral sides. A first plurality of mixing baffles 130A, 130C, 130E, and 130G are disposed on the first lateral side 170 of the conveyor 110. A second plurality of mixing baffles 130B, 130D, and 130F are disposed on the second lateral side 172 of the conveyor 110. In this orientation, the first plurality of mixing baffles disposed on the first lateral side 170 cause seed to move from the first lateral side 170 to the second lateral side 172. In a similar manner, the second plurality of mixing baffles disposed on the second lateral side 172 cause particulate material to move from the second lateral side 172 to the first lateral side 170.

Figure 3:
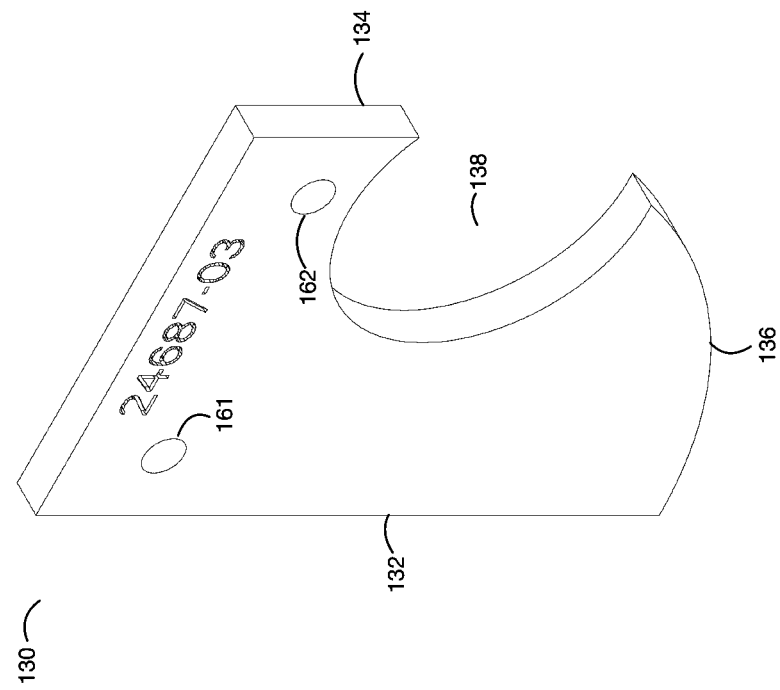
FIG. 3 is a top-side perspective view of a mixing baffle.

There is a compromise between material transfer rate of the conveyor and the amount of mixing—the more backflow and lateral movement is induced, the less downstream movement there is of the particulate material. In order to provide a thorough mixing while maintaining flow rates, a passage 138 can be provided in one or more of the mixing baffles 130. A mixing baffle 130 is shown in FIG. 3 having a passage 138 disposed in a peripheral portion 134 of the mixing baffle. The lower portion 136 of the mixing baffle comprises an arc having a profile corresponding to the curvilinear structure 114. The lower portion 136 is disposed near the carrying surface of the belt in order to engage the bottom of the stream of particulate material. In the example of a seed treatment system, the belt may incorporate texture on the carrying surface to assist with traction for carrying the load up an incline, such as raised crescents that assist with carrying the load. The lower portion 136 of the mixing baffle 130 is disposed at a predetermined distance from the raised crescents. In one embodiment, the bottom of the mixing baffle 130 is located above the raised crescents by less than three average diameters of the particulate material. In one embodiment, the bottom of the mixing baffle 130 is located above the raised crescents by approximately ⅜". Similarly, the arc of lower portion 136 of the mixing baffle follows the belt conformed to the curvilinear structure 114 around to the sidewall 154 at a similar spacing. Having a space in between the top of the belt texture and the bottom of the mixing baffle 130 prevents seed damage from friction or pinching.

Figure 4:
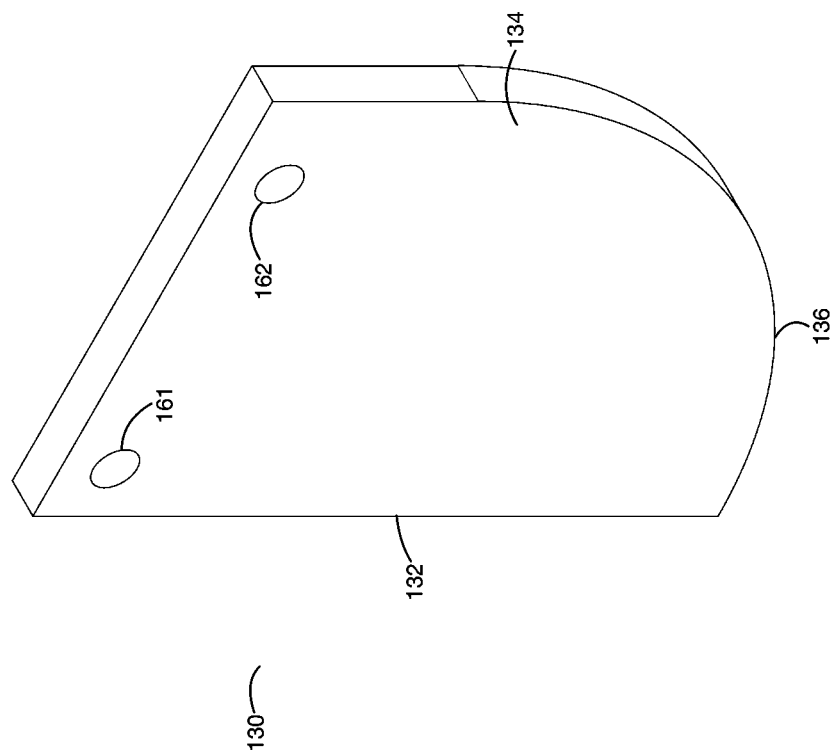
FIG. 4 is a top-side perspective view of a mixing baffle.

As shown in FIG. 3, the mixing baffle 130 comprises a first aperture 161 and a second aperture 162 for securing the mixing baffle to a mounting bracket 160. The mixing baffle also comprises a downward extending section. In FIG. 3, the downward extending section is the central portion 132. The lower portion 136 extends laterally. Alternatively, as shown in FIG. 5 the downward extending section is the peripheral portion 134. In both the embodiment in FIG. 3 and FIG. 5, the mixing baffle 130 has a downward extending portion and a lateral extending portion. The passage 138 may be semicircular, otherwise curvilinear, rectangular, or other aperture shape to allow a top portion of the seed stream to flow over the lower portion 136. In FIG. 4, there is no passage disposed in the mixing baffle 130. Alternatively, the mixing baffle 130 may have a central downward extending portion and have a lower portion that extends laterally in one or both lateral directions. The mixing baffle 130 may have one or multiple passages therethrough.

As shown in FIG. 1, alignment of the mixing baffles may be: first baffle 130A is on the first lateral side 170, with the first passage 138A disposed in the first peripheral portion 134A; second baffle 130B is on the second lateral side 172, with the second passage 138B disposed in the second central portion 132B; third baffle 130C is on the first lateral side 170, with the third passage 138C disposed in the third peripheral portion 134C; the forth baffle 130D is on the second lateral side 172, with the forth passage 138D disposed in the fourth central portion 132D. In this pattern, there is a clear passageway for the top portion to move through the curvilinear structure 114. Alternatively, the pattern of the passage location may alternate, where a first mixing baffle is disposed in a first lateral side with a peripheral passage, followed by a second mixing baffle disposed in a second lateral side with a peripheral passage, followed by a third mixing baffle disposed in a first lateral side with a central passage, followed by a fourth mixing baffle disposed in a second lateral side with a central passage, and then repeating this pattern. In this pattern, there is no clear passage for portion of the particulate stream to travel through the curvilinear structure of the incline conveyor. Alternatively, the pattern of the passage location may alternate, where a first mixing baffle is disposed in a first lateral side with a peripheral passage, followed by a second mixing baffle disposed in a second lateral side with a peripheral passage, followed by a third mixing baffle disposed in a first lateral side with a peripheral passage, followed by a fourth mixing baffle disposed in a second lateral side with a central passage, and then repeating this pattern.

In one embodiment, the mixing baffles 130 have a tapered or beveled edge to prevent damage to seed contacting an edge of the mixing baffles.

The mixing baffle can be statically mounted to the lid 120, the conveyor frame (not shown), or the curvilinear structure 114. The statically mounted mixing baffle can be bolted or welded within the tube, or otherwise securely mounted within the tube. Alternatively, the mixing baffles can be adjustably mounted, where the mixing baffles can be selectively deployed. The mixing baffle 130 can be mounted to a hinge bracket. In this way, the mixing baffle can be selectively deployed to enable the conveyor to have a transfer-speed-maximizing mode and a mixing mode. The hinge bracket may be limited at an angle less than or equal to 90 degrees.

As an alternative application, this Mixing Inclined Belt Conveyor having Static Baffles with Passages may be employed to mix or blend dry particulate fertilizer during transport, to blend seed varieties, and to mix powdered, dry agrochemical to a seed.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises", and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

We claim:

1. A method for mixing a stream of a particulate material within an incline conveyor, the method comprising the steps of:
   a. carrying the stream of the particulate material, wherein the particulate material is a quantity of a plant seed, on a belt upward through a curvilinear structure; and
   b. inducing backflow of a majority of the depth of the stream of the particulate material with a mixing baffle statically mounted to a lid above the belt.

2. The method of claim 1, further comprising the step of:
   a. inducing lateral movement in addition to the backflow.

3. The method of claim 1, further comprising the step of:
   a. distributing a liquid treatment about the particulate material into an even coat within the incline conveyor.

4. The method of claim 1, further comprising the steps of:
   a. inserting a first mixing baffle into the stream of the particulate material; and
   b. allowing a portion of the stream of the particulate material to travel through a passage in the first mixing baffle.

5. The method of claim 1, further comprising the steps of:
   a. disposing throughout a longitudinal portion of the conveyor a plurality of mixing baffles having a width of approximately one half of a diameter of the curvilinear structure.

6. The method of claim 1, further comprising the step of:
   a. inclining the incline conveyor to an angle less than the angle of repose of the particulate material.

7. The method of claim 1, wherein the step of inducing backflow, approximately one half of the stream of the particulate material is disrupted.

8. The method of claim 1, wherein the mixing baffle has a lower portion that is conformed to a sidewall of the curvilinear structure.

9. The method of claim 1, wherein the plant seed is a treated plant seed.

10. A method for mixing a stream of a particulate material within an incline conveyor, the method comprising the steps of:
    a. transporting the stream of the particulate material, wherein the particulate material is a plant seed, on a belt upward through a curvilinear structure; and
    b. inducing a prescribed amount of backflow with a partial obstruction statically mounted to a lid above the belt transporting the stream of the particulate material within the incline conveyor.

11. The method of claim 10, further comprising the step of:

a. mounting a first mixing baffle between a 20° to 70° angle between a first plane defined by the first mixing baffle and vertical plane tangential to a curvilinear structure.

12. The method of claim 11, further comprising the step of:
a. allowing the stream of the particulate material to travel through a passage in the first mixing baffle, wherein the passage is disposed above a lower portion of the first mixing baffle comprising an arc having a profile corresponding to the curvilinear structure.

13. The method of claim 10, further comprising the step of:
a. mounting a first mixing baffle within the incline conveyor so that the first mixing baffle is selectively deployable.

14. The method of claim 10, further comprising the step of:
a. distributing a wet liquid seed treatment about the particulate material into an even coat within the incline conveyor.

15. The method of claim 10, wherein the step of transporting, the partial obstruction disrupts a bottom portion of the stream of the particulate material across one half of a diameter of the curvilinear structure.

16. The method of claim 10, wherein the plant seed is a treated plant seed.

17. A method for mixing a stream of a particulate material within an incline conveyor, the method comprising the steps of:
a. moving the stream of the particulate material, wherein the particulate material is a quantity of a plant seed, on a belt upward through a curvilinear structure to form a static flow of the stream of the particulate material; and
b. disrupting an approximate one-half diameter of the static flow with a mixing baffle statically mounted to a lid above the belt.

18. The method of claim 17, further comprising:
a. allowing a top portion of the static flow to flow over a lower portion of the mixing baffle.

19. The method of claim 17, wherein the lower portion of the mixing baffle comprises an arc having a profile corresponding to the curvilinear structure.

20. The method of claim 17, wherein the plant seed is a treated plant seed.

* * * * *